United States Patent [19]

Labrecque

[11] 4,290,283

[45] Sep. 22, 1981

[54] HUB CAP LOCK DEVICE

[76] Inventor: Clovis Labrecque, 2135 Comtois, Sillery, Province of Quebec, Canada

[21] Appl. No.: 960,773

[22] Filed: Nov. 15, 1978

Related U.S. Application Data

[63] Continuation-in-part of Ser. No. 843,967, Oct. 20, 1977, abandoned.

[30] Foreign Application Priority Data

Oct. 5, 1977 [CA] Canada .................................. 288172

[51] Int. Cl.³ .............................................. B65D 55/14
[52] U.S. Cl. .................................................... 70/167
[58] Field of Search ................ 70/163, 164, 166, 167, 70/168, 169, 259, 260; 301/37 AT, 37 R, 37 S, 375 C, 37 TD, 37 PB; 152/428, 431

[56] References Cited

U.S. PATENT DOCUMENTS

| 3,170,733 | 2/1965 | Lamme | 301/37 AT |
| 3,352,133 | 11/1967 | Selleck | 301/37 AT |
| 3,918,764 | 11/1975 | Lamme | 301/37 AT |
| 4,083,606 | 4/1978 | Scruggs | 301/37 AT |

Primary Examiner—Robert L. Wolfe

[57] ABSTRACT

A hub cap lock device adapted to be installed upon the air valve of a vehicle wheel tire or upon a threaded stud projecting from the wheel includes a housing with an internal cavity; means are provided at one end of the housing for securing the housing to the wheel part and a cap member is mounted at the opposite end of the housing for engagement with the hub cap; the cap has a flange portion with a dimension slightly greater than a hole in the hub cap; and a lock engagedly received in the housing secures the cap member to the housing thereby preventing unauthorized removal of the hub cap.

14 Claims, 11 Drawing Figures

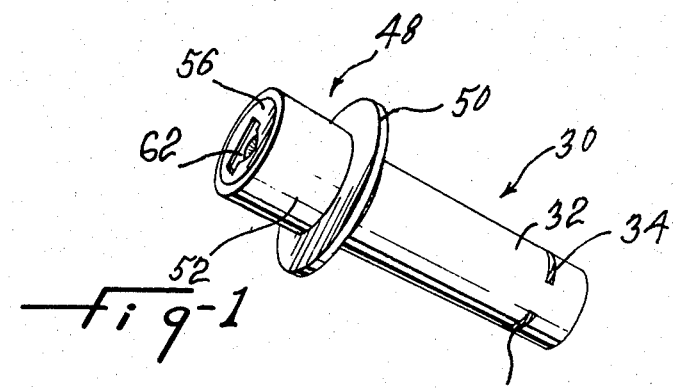
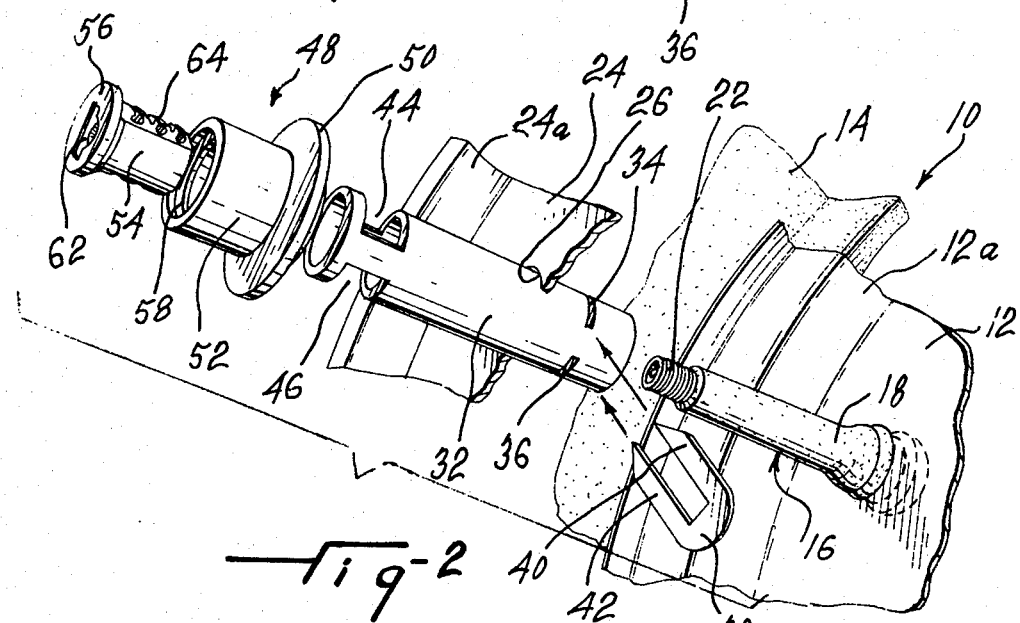
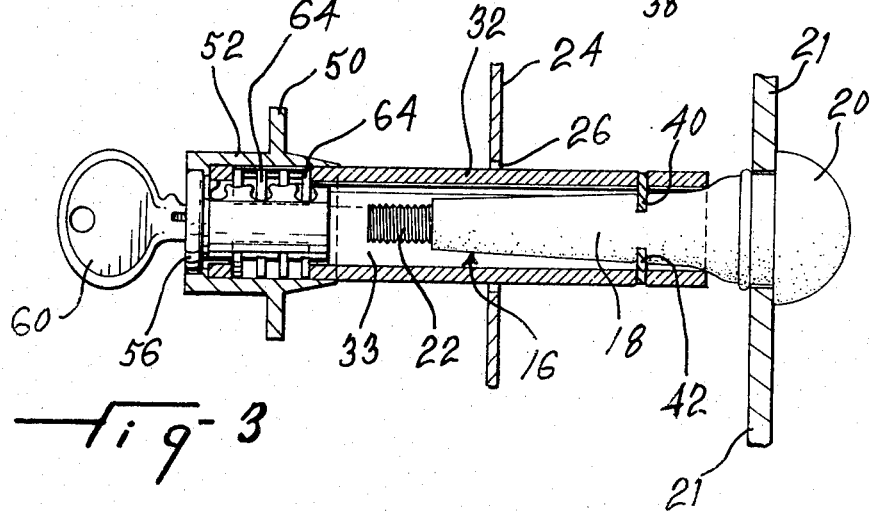

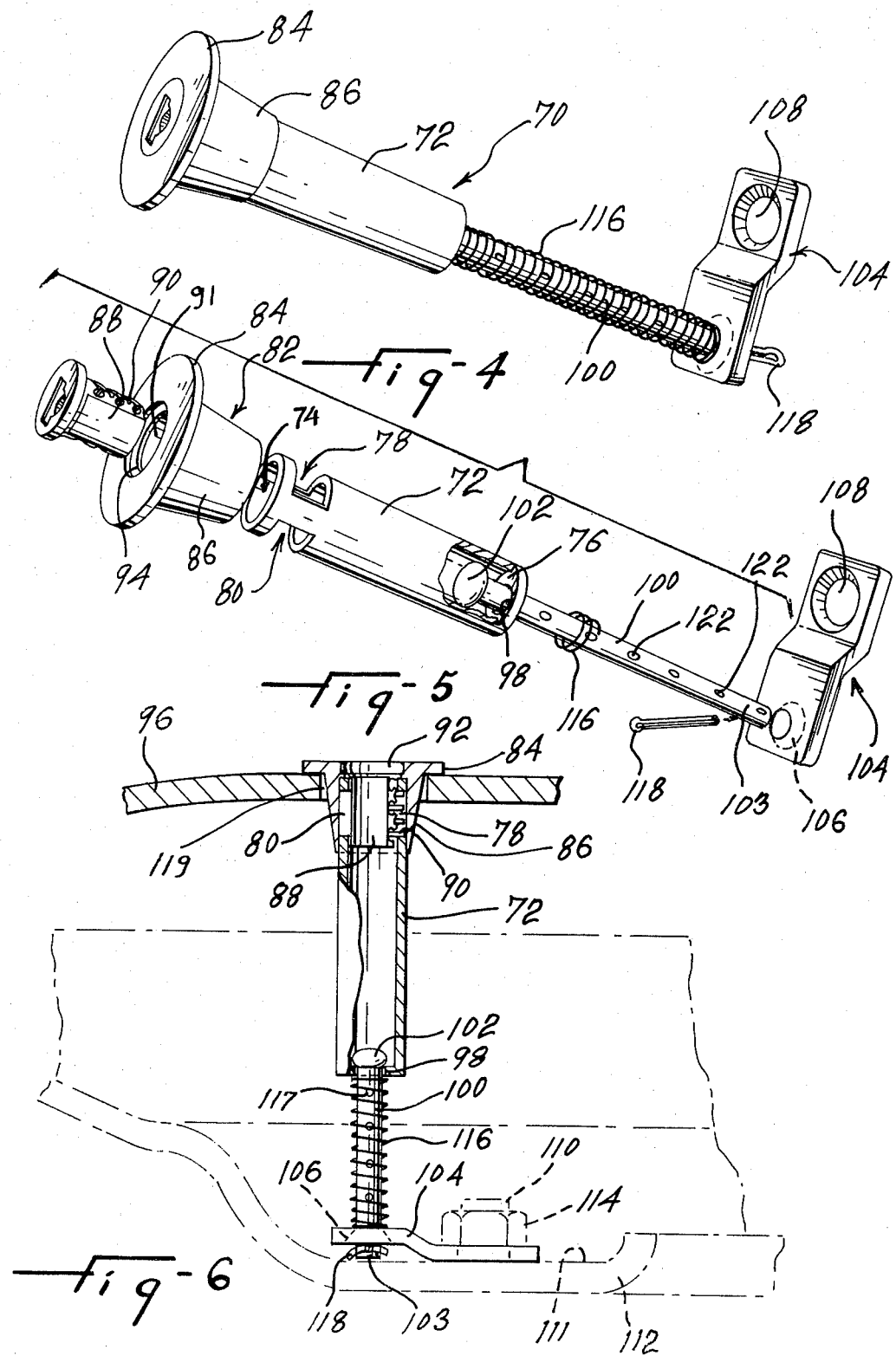

HUB CAP LOCK DEVICE

This is a continuation-in-part of application Ser. No. 843,967 filed Oct. 20, 1977 and now abandoned.

FIELD OF THE INVENTION

The present invention relates to hub cap lock devices, more particularly those which are adapted to be mounted on a projecting part of a vehicle wheel, such as the air valve of a wheel tire or the threaded stud of the wheel disc.

BACKGROUND OF THE INVENTION

Hub cap locks of the type adapted to engage the air valve of an automobile tire are known; one example of such devices may be found described in U.S. Pat. No. 2,919,739 issued Jan. 5, 1960. Most of these devices are concerned with adding to the valve stem a device having a threaded part which is adapted to engage the threaded extremity of the valve stem.

Hub cap locks of the type adapted to engage a bolt or threaded stud of an automobile tire are also known; one example of such devices may be found described in U.S. Pat. No. 3,352,133 issued Nov. 14, 1967. In this type of locks, the hub cap forms part of the lock assembly; also, the locking device is particularly adapted to fit over the hub projection that extends outside the wheel and to engage each of the conventional wheel bolts.

OBJECTS AND STATEMENT OF THE INVENTION

It is an object of the present invention to provide a hub cap lock device which may be readily installed in position on a vehicle wheel to prevent unauthorized removal or loss of the hub cap.

It is another object of the present invention to provide a hub cap lock device which is simple in construction, inexpensive in cost and effective in preventing a hub cap from being stolen or lost.

Another object of the present invention is to provide a hub cap lock device which is adapted to be installed upon the rubber covered valve stem of a vehicle tire.

Another object is to provide a hub cap lock device which is adapted to be installed upon only one of the bolts or threaded studs of a wheel disc and which allows a certain amount of maneuverability to accurately position one part of the lock device in registery with a hole provided in the hub cap.

The present invention therefore relates, in its broadest aspect, to a hub cap lock device adapted to be installed upon a projecting part of a vehicle wheel, the hub cap having an aperture therein, comprising: a housing having an internal cavity; means mounted at one end of the housing for fixing the housing to the projecting part of the vehicle wheel; cap means mounted at the opposite end of the housing, said cap means including a bore and a flange portion having a dimension slightly larger than the aperture in the hub cap so that the housing may extend therein; and lock means engagedly received in the bore and in the cavity of the housing for locking the cap means to the housing to thereby prevent removal of the hub cap outwardly of the wheel.

In one embodiment of the invention, the hub cap lock device is adapted to be installed upon the rubber covering of the valve which projects through a hole provided in the hub cap; the valve is received axially inside the internal cavity of the housing and means are provided to clip the rubber covering of valve inside the cavity.

In another embodiment of the invention, the hub cap lock device is adapted to be installed upon the stud projecting from the hub disc of a vehicle wheel and means are provided for attaching the housing to the stud.

Other objects, purposes and characteristic features of the present invention will be, in part, obvious from the accompanying drawings and, in part, pointed out as the description of the invention progresses. In describing the invention in detail, reference will be made to the accompanying drawings, in which like reference characters designate corresponding parts throughout the several views.

BRIEF DESCRIPTION OF THE DRAWINGS

FIG. 1 is a perspective view of one embodiment of a hub cap lock device made in accordance with the present invention;

FIG. 2 is an exploded view thereof wherein the lock device is shown adapted to be installed upon the rubber covering of a valve which projects through a hole provided in the hub cap of a vehicle tire;

FIG. 3 is a cross-sectional view of the device of FIG. 2 in locking engagement;

FIG. 4 is a perspective view of another embodiment of a hub cap lock device made in accordance with the present invention;

FIG. 5 is an exploded view thereof;

FIG. 6 is a partly cross-sectional view thereof of the device of FIG. 5 in locking engagement with the bolt of a vehicle wheel disc;

DESCRIPTION ON PREFERRED EMBODIMENTS

Figure 7:
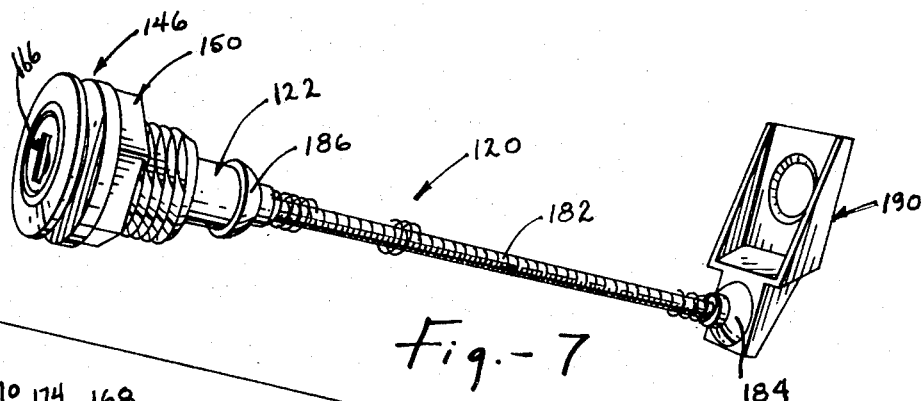
FIG. 7 is a perspective view of another embodiment of a hub cap lock device made in accordance with the present invention.

In the drawings, there is shown two embodiments of the present invention: on the one hand, a hub cap lock device adapted to be installed upon the air valve of a vehicle tire (FIGS. 1–3) and, on the other hand, a hub cap lock device adapted to be installed upon the threaded stud of a vehicle wheel disc (FIGS. 4–6).

Referring to FIGS. 1–3, a vehicle wheel, partly shown and generally denoted 10, is represented as including a conventional rim 12 on which is mounted the usual tire 14 provided with the usual valve, generally designated 16, for admitting and releasing compressed air. The valve 16 includes a tapered sleeve 18 of natural or synthetic rubber or other suitable material, the enlarged end portion 20 of which bears against the inner wall 21 of the rim 14. Rubber sleeve 18 covers the valve stem, the outer portion 22 of which is threaded to receive a cap or valve extension (not shown), the remaining portion of stem being covered by sleeve 18. The construction of such air valve is standard for the majority of manufacturer of tires and will not be further described in detail.

It is customary to cover the wheel hub and/or the wheel nuts of a vehicle wheel with a hub cap 24, partly shown in FIGS. 2 and 3, the peripheral portion 24a of which is usually shaped to fit the contour of the peripheral edge portion 12a of the rim. Also, an opening 26 is usually provided in the hub cap for the passage of valve 16 therethrough.

The lock device, generally designated as 30, is adapted to be installed upon the valve portion 18. This lock device includes a tubular housing 32 with an internal cavity 33 which receives from one end thereof a major portion of the rubber sleeve 18 of the valve. At this end, the wall of housing 32 has two diametrically circumferential slots 34 and 36 having a width sufficient to receive therein a U-shaped clip 38. The free ends 40 and 42 of clip 38 are chamfered so that, when the clip is inserted through slots 34 and 36, when valve portion 18 is inside internal cavity 33 of the housing, it may easily penetrate and shear the rubber jacket 18 of the valve to thereby effect a fixed connecting between housing 32 and valve 16. The opposite end of housing 32 also includes two diametrically opposed slots 44 and 46 of larger width than the clip-receiving slots 34 and 36; the function of slots 44 and 46 will be described hereinbelow.

The lock device further includes a cap member 48 which is in the form of a socket which fits over the end portion of housing 32; the cap member includes a wall portion 52 from which extends a flange 50. The length of wall 52 must extend at least to cover slots 44 and 46.

The lock device also includes a lock barrel 54 adapted to be received within the internal cavity 33 of housing 32. The barrel includes a key-receiving plate 56 which abuts against a shoulder 58 projecting from the inside wall of the cap member. A key 60 may be inserted in the opening 62 of the plate for sliding spring-loaded tumblers 64 in slots 44 and 46 of housing 32.

To effect a locking engagement of the hub cap 24 to the valve 16, housing 32 is first slipped over rubber sleeve 18. Then, clip 38, manually or with the aid of a tool, is inserted in slots 34 and 36 thereby penetrating by shear the rubber sleeve 18 and causing a firm engagement between the housing and the valve. For further securement, the ends 40 and 42 may be clipped one toward the other. Then, the hub cap 24 is placed on the rim making sure that valve 16 extends through hole 26. Cap member 48 is then placed over the free end of housing 32 and barrel 54 is inserted in the bore of the cap member. To effect the locking engagement, a key is inserted in the barrel causing tumblers 64 to be received in slots 44 and 46. In the event that it is required to inflate the tire or to remove the hub cap for changing a wheel, the key is used to disengage the tumblers from the housing 32 whereby the cap member is slid off the housing; hence, the hub cap 24 can be slid outwardly on the housing 32. An air valve extension which may be threadedly engaged to the extremity of valve stem 22 will be required in cases to inflate the tire. It is not necesssary for flange portion 50 of the cap member to bear against the hub cap facing wall; however, the overall diameter of the flange should be greater than that of the hub cap opening 26.

Various changes may be brought to the lock device described above without however departing from the scope; for example, an internal groove may be provided on the inside wall of the housing 32 instead of the pair of openings 44 and 46 shown. Similarly, the number of slots 40 and 42 may vary. There may be provided a series of longitudinally spaced slots to fit various sizes of tire valves.

Referring to FIGS. 4-6 of the drawings, a second embodiment of a lock device made in accordance with the present invention will now be described. This lock device, generally denoted 70, includes a cylindrical housing 72 having an open end 74 and a wall 76 at the opposite end thereof.

Adjacent end 74, housing 72 has two diametrically opposite openings 78 and 80. A cap member, generally designated as 82, overlies both openings at end 74. Cap member 82 is in the form of a socket including an annular flange portion 84 and a conical portion 86 which fits over the outside wall of housing 72. A lock barrel 88 equipped with tumblers 90 is adapted to be received inside bore 91 of cap member 82. A key (not shown) serves to actuate tumblers 90 in openings 78 and 80 to lock the lock barrel to the housing. This is achieved by the provision of the lock receiving plate 92 on barrel 88 which abuts against a shoulder 94 provided in the central bore 91 of the cap member. Flange portion 84 of the cap member abuts against the outside wall of hub cap 96 of a vehicle tire (not shown).

Wall 76 of housing 72 includes a central opening 98 through which extends an elongated connecting rod 100. One end 102 of the rod is rounded and substantially larger than the central opening 98 thereby ensuring that the connecting rod cannot be pulled out of housing 72. The opposite end of rod 100 is loosely connected to a bracket 104 by means of a pin 118 extending through hole 117 at the end 102 of the rod. Bracket 104 is provided with a first opening 106 to receive extremity 103 of the rod and a second opening 108 which is adapted to be installed upon bolt or threaded stud 110 of a vehicle wheel disc 112. Nut 114 serves to secure the bracket to the wheel disc.

A spring 116 extends around rod 100 between housing 72 and bracket 104; its function will hereinafter be described.

The use of lock device 70 will now be described. A hole 119 is made (in some cases, is provided) in hub cap 96; the diameter of hole 119 should correspond to the greatest diameter on the outside wall of the conical portion 86 of the cap member but smaller than the diameter of flange portion 84. The distance between the hub cap 96 and the outer face 111 of rim 112 is then measured and extremity 103 of rod 100 is cut so that the head 102 of the rod will bear against wall 76 of housing 72. A cutter pin 118 secures the rod to the bracket. The assembly of housing 72, rod 100 and bracket 104 (without cap member 82 and lock barrel 88) is mounted to the wheel disc 112 by fastening nut 114 over bracket 104 on stud 110. Hub cap 96 is then mounted to the wheel rim. End 74 of housing 72 should be registry with hole 119 of the hub cap; however, should there by some offset between the two, the housing may be easily located and brought to the exact position to receive the cap member by a small tool. The positioning of the housing being permitted by having opening 98 in wall 76 and/or opening 106 in bracket 104 slightly greater than required for the passage of the connecting rod therethrough. Spring 116 ensures that end 74 of housing 72 is adjacent the inner wall of the hub cap. Cap member 82 is inserted over housing 72 and lock barrel inserted to lock the cap member to the housing.

Figure 8:
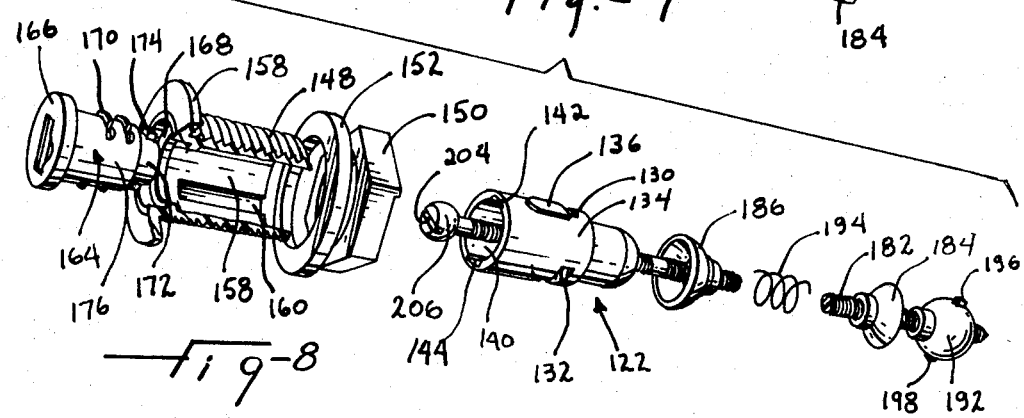
FIG. 8 is an exploded, partly broken, view thereof.
Figure 11:
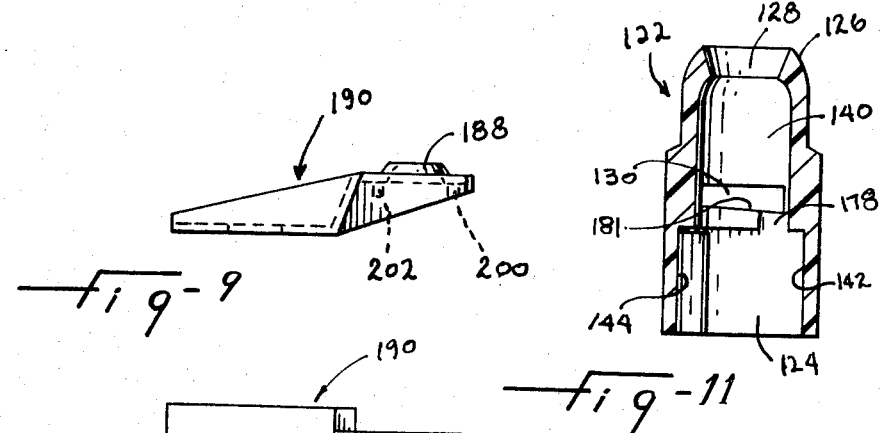
FIG. 11 is a cross-sectional elevation view of the housing used in the embodiment illustrated in FIG. 7.
Figure 9:
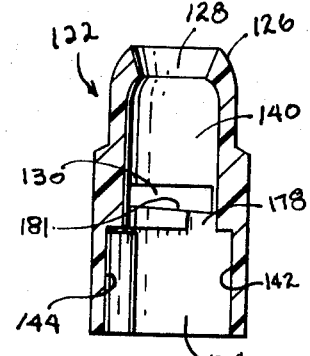
FIG. 9 is a side elevation view of the bracket used with the embodiment of FIG. 7.
Figure 10:
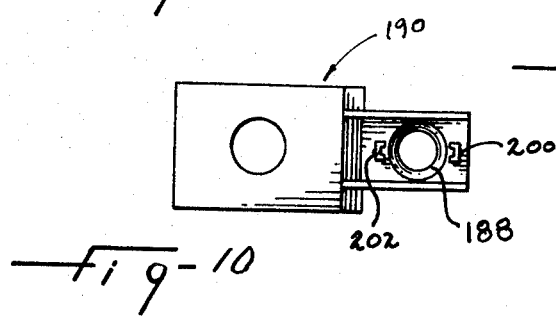
FIG. 10 is a bottom view of the bracket shown in FIG. 9.

Referring to FIGS. 7-11 of the drawings, there is shown another embodiment of a hub cap lock device made in accordance with the present invention.

This lock device, generally denoted 120, includes a cylindrical housing 122 having an open end 124 and an opposite rounded end 126 with a circular aperture 128. Housing 122 includes two opposite radial openings 130, 132, the function of which will hereinafter be described. The outer wall 134 of the housing includes two diametrically opposite lugs 136 extending longitudinally of the housing. The inner wall 140 of the housing includes two diametrically opposite grooves 142,144 extending longitudinally of the housing in alignment with lugs 136.

A cap member 146 has a threaded outer portion 148 to receive a nut 150 which, together with a washer 152, serves to mount the lock device to a hub cap (not shown). The cap member includes a flanged portion 156 having a dimension slightly larger than the hole made in the hub cap (as described above) and a bore 158 slightly greater than the outer wall 134 of the housing so that housing 122 may extend therein. Bore 158 includes two diametrically opposite elongated grooves 160 to receive lugs 136.

The lock device also includes a lock barrel 164 having a key receiving plate 166 which abuts against the shoulder 168 of the bore. When housing 122 is inserted in bore 158, tumblers 170 of the barrel come in registry with recesses 160. At the opposite end of the barrel, there is provided a restricted portion 172 having two diametrically opposite small lugs 174,176. When the lock barrel is inserted in the housing, lugs 174,176 pass directly in diametrically opposite restricted passageways 178 and stop in slotted openings 130,132, respectively. A 90° rotation of the lock barrel snugly engages the lugs into the radial openings which may have a slanted edge 181 for tighter engagement; the key may then be retracted from the lock barrel whereby the tumblers exit from the barrel into the opposite grooves 160.

In this embodiment, the connection of the housing with the projecting part of the vehicle wheel is effected by means of a threaded elongated shaft 182 that has, at opposite end thereof, two cup-shaped members 184,186, one of which bits the curved end 126 of the housing while the opposite one abuts a partially spherical extension 188 on the bracket 190 which is adapted to be mounted to the threaded stud (not shown) of a vehicle wheel disc. The lower extremity of shaft 182 threadedly receives spherically-shaped member 192 having a threaded bore therein. A spring 194 on shaft 182 maintains opposite pressure on part 188 at one end and on housing 122 at the other end. The shaft is made of a material which can be cut so that its length may be made to correspond to the distance between the wheel disc and the hub cap. Two diametrically opposite small lugs 196,198 on member 192 prevent it from rotating in the bracket portion 188 by engaging two correspondingly shaped projections having recesses 200,202 receiving the lugs. The shaft 182 is threaded through member 192 by means of a screwdriver which may be inserted in the housing and fitted in an appropriate slot 204 in the upper spherical head 206 of the shaft.

The embodiments of the invention in which an exclusive property or privilege is claimed are defined as follows:

1. A hub cap lock device adapted to be installed upon a stud projecting from the hub disc of a vehicle wheel; the hub cap having an aperture therein, comprising: a hollow tubular housing having an internal cavity in registry with said aperture of said hub cap, a connecting rod having one end engagedly mounted in said one end of said housing and the other end engagedly mounted to a bracket means attached to said stud, cap means mounted at the opposite end of said housing, said cap means including a flange portion having a dimension slightly larger than the aperture in the hub cap and a bore slightly greater than said housing so that said housing may extend therein; and lock means engagedly received in said bore and in said cavity of said housing for locking said cap means to said housing to thereby prevent removal of the hub cap outwardly of said wheel.

2. A hub cap lock device as defined in claim 1, further comprising spring means mounted on said connecting rod and extending between said bracket means and said one end of said housing for maintaining said one end of said connecting rod adjacent said one end of said housing.

3. A hub cap lock device as defined in claim 1, further comprising a pin connecting said rod to said bracket means, said connecting rod including a series of longitudinally spaced pin-receiving holes whereby said connecting, being severable at various lengths therealong, may receive a pin in a pin-receiving hole associated with a severed end of said rod.

4. A hub cap lock device as defined in claim 1, wherein said one end of said housing has a wall provided with a central opening for the passage of said one end of said connecting rod therethrough and wherein said bracket means has an opening for the passage of said opposite end of said connecting rod therethrough; both said openings having a diameter substantially greater than that required for the passage of said rod therein to facilitate positioning of said housing in registry with the aperture in said hub cap.

5. A hub cap lock device adapted to be installed upon a stud projecting from the hub disc of a vehicle wheel, the hub cap having a hole, comprising in combination: a tubular housing having an internal cavity in registry with said hole of said hub cap and a wall having a central opening closing one end thereof, a connecting rod having one end extending through said central opening in said wall and the other end engaged to a bracket means mounted to said stud thereby; fixing said housing to said stud cap means mounted at the opposite end of said housing and extending into the hole of said hub cap, said cap means having a bore and a flange portion adapted to bear against said hub cap to prevent movement thereof in a direction outwardly of said wheel; and lock means engagedly received in said bore and in said cavity at said opposite end of said housing for locking said cap means to said housing to thereby prevent removal of the hub cap off said wheel.

6. A hub cap lock device as defined in claim 5, further comprising spring means mounted on said connecting rod and extending between said bracket means and said wall for maintaining said one end of said connecting rod adjacent said wall inside said housing.

7. A hub cap lock device as defined in claim 5, further comprising a pin connecting said rod to said bracket means, said connecting rod including a series of longitudinally spaced pin-receiving holes whereby said connecting rod, being severable at various lengths therealong, may receive a pin in a pin-receiving hole associated with a severed end of said rod.

8. A hub cap lock device as defined in claim 5, wherein said bracket means includes an opening for the passage of the opposite end of said connecting rod therethrough; said opening and said central opening in said wall of said housing having a diameter slightly greater that that required for the passage of said connecting rod therethrough to facilitate positioning of said housing in registry with said hole in said hub cap, said hole being slightly larger than the outer diameter of said housing.

9. A hub cap lock device as defined in claim 5, wherein said lock means include rotatable barrel means having tumbler means and lug means at one end thereof; said housing being cylindrically formed and provided with slot means engagedly receiving said lug means therein to secure said barrel means in said housing.

10. A hub cap lock device as defined in claim 9, wherein said housing has an inner wall provided groove means receiving lug means on the outer wall of said housing for guiding said bore over said housing.

11. A hub cap lock device as defined in claim 9, wherein said housing includes groove means on the inner wall thereof for receiving said tumbler means therein when in locking engagement with said housing.

12. A hub cap lock device as defined in claim 5, wherein said connecting rod is a threaded shaft having at one end thereof a spherical-shaped member having a threaded bore engaging said shaft.

13. A hub cap lock device as defined in claim 12, wherein said spherical-shaped member has lug means thereon; said lug means adapted to be received in recess means on said bracket means for preventing rotation of said spherical member as said shaft is threadedly rotated therein.

14. A hub cap lock device as defined in claim 13, wherein the opposite end of said shaft includes a screwdriver receiving slot for rotation of said shaft.

* * * * *